Oct. 8, 1946.    J. SIMPSON, JR., ET AL    2,409,158
APPARATUS FOR TRIMMING COMMUTATORS
Filed Dec. 30, 1944    2 Sheets-Sheet 2

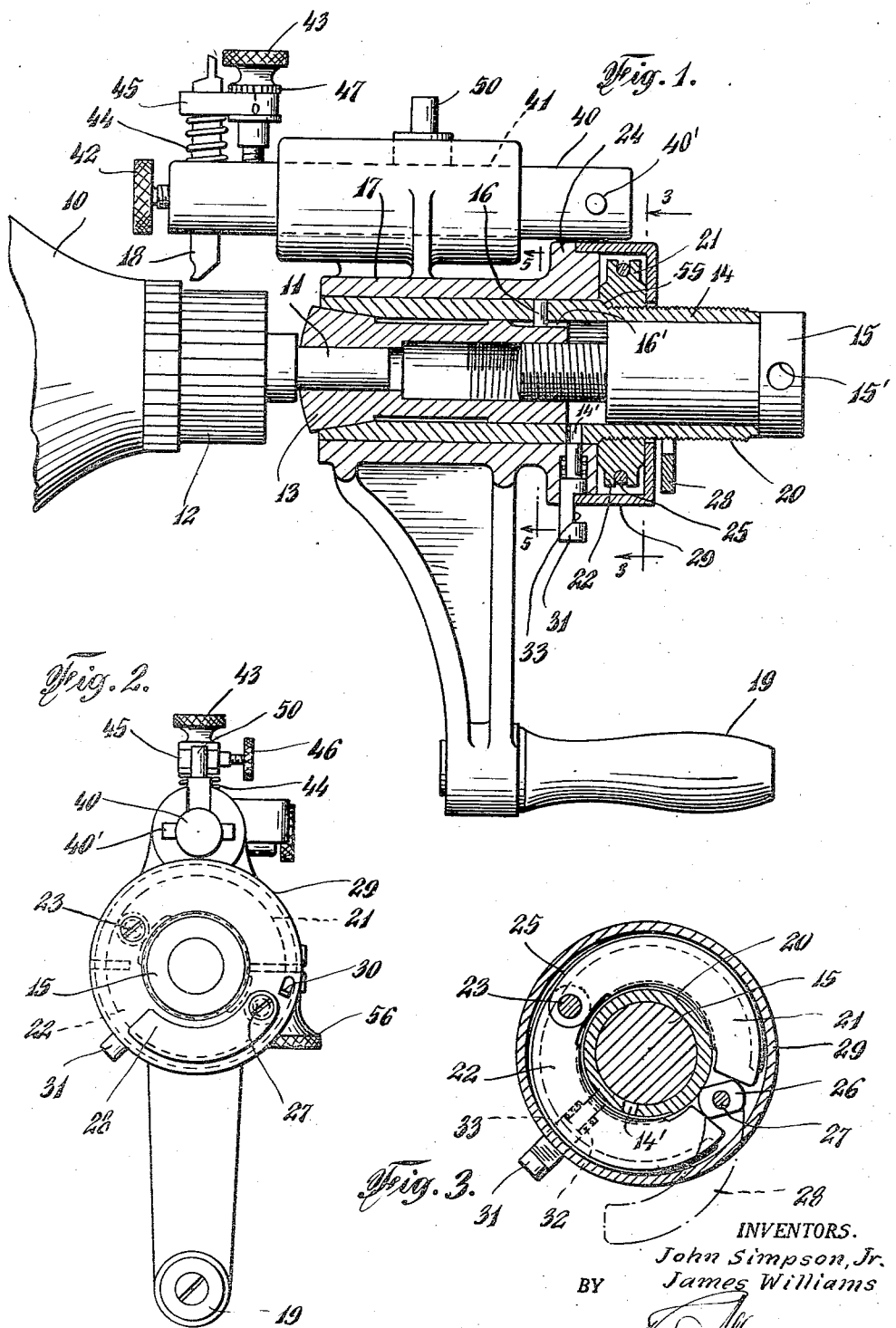

INVENTORS.
John Simpson Jr.
James Williams
BY
ATTORNEY.

UNITED STATES PATENT OFFICE

2,409,158

APPARATUS FOR TRIMMING COMMUTATORS

John Simpson, Jr., and James Williams, North Tiverton, R. I.; said Williams assignor to said Simpson, Jr.

Application December 30, 1944, Serial No. 570,570

3 Claims. (Cl. 82—4)

Our invention relates to cutting tools especially for truing and undercutting commutators of electric motors and generators.

A portable tool of this character is shown and described in the Mansfield Patent 2,145,091.

The main object of our present invention is to perfect such a tool for general commercial use. Such a tool is provided with a collet or chuck adapted to be mounted on the end of the armature whose commutator is to be trimmed and the cutter is carried by a body which is advanced and retracted by rotation about the axis of the armature which is held stationary in a vise. For this purpose the collet is longitudinally adjustable in a sleeve which has an external screw thread and the cutter carrier body is rotatably mounted on this sleeve and has a split nut adapted to engage the screw threads to feed the cutter carrier along the sleeve as the body is rotated. As such tools must be used with various sizes of armature shafts and various sizes of commutators it is necessary to provide many adjustments. Unless these adjustments are properly made and the tool carefully used the commutator segments or the wiring is likely to be damaged. Accordingly we have sought to provide means for ensuring proper adjustments and automatically controlling the feed of the cutter by disconnecting the nut and preventing further feed when the cutter has reached the end of the proper cutting area.

We have also sought to protect the split nut and its cam. Specifically we provide an interlocking pin to facilitate the adjustment of the collet on the armature shaft and we hold it in place by the same shield which houses the split nut and cam. We also provide means for holding the sleeve to permit adjustment of the collet.

In the drawings,

Fig. 1 is a side elevation and partial section of a cutting tool embodying our invention.

Fig. 2 is an end view thereof looking from the right of Fig. 1.

Fig. 3 is a sectional view through the inner sleeve member showing the parts unlocked.

Figure 4:
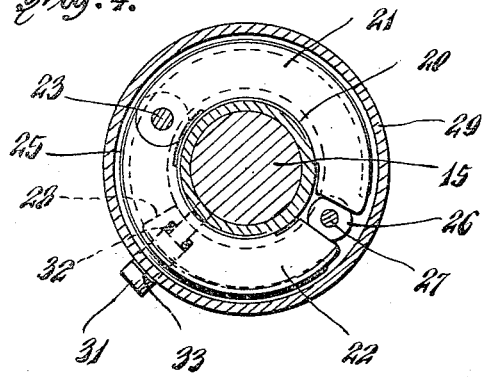
Fig. 4 is a similar view showing the parts locked.
Figure 5:
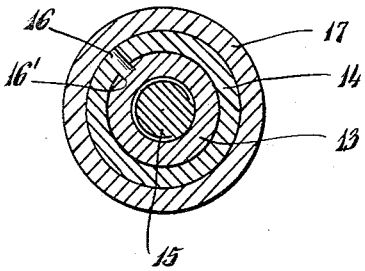
Fig. 5 is a sectional view taken on the plane of the line 5—5 of Fig. 1.
Figure 6:
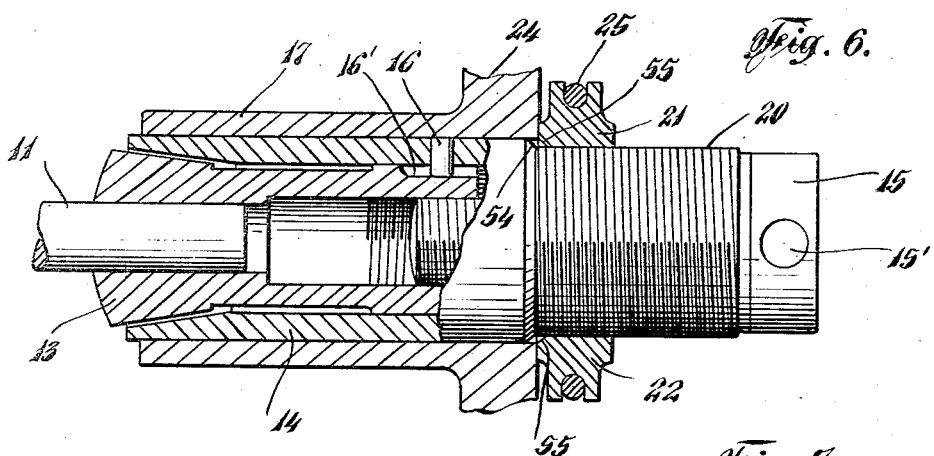
Fig. 6 is an enlarged sectional view showing the collet, spindle sleeve and associated parts.
Figure 7:
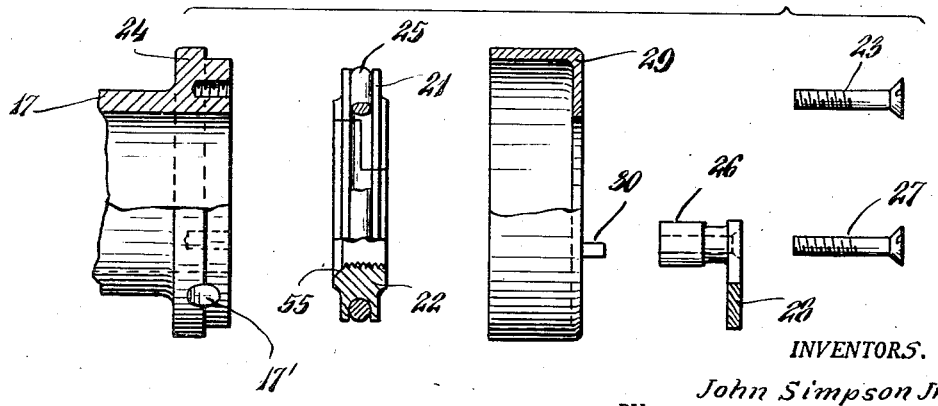
Fig. 7 is an exploded partial sectional view showing the split nut and associated parts.

An armature 10 having a shaft end 11 and a commutator 12 is held stationary in a vise (not shown) and the tool is supported on the shaft by a collet or contractible chuck 13 whose jaws are clamped on the shaft by a sleeve or spindle 14 and a draw-in screw 15. A pin 16 extends from the sleeve into a slot 16' in the shank of the collet to prevent relative rotation when the draw-in screw 15 is tightened.

The body 17 of the tool fits snugly on the sleeve, carries a cutter 18 in a manner to be described and is rotatable by means of a handle 19. The sleeve 14 has a screw thread 20 on the end opposite the collet and these threads are adapted to be engaged by corresponding screw threads in a split nut 21, 22. The two halves of this nut are hinged on a screw stud 23 which is seated in the flange 24 of the body. A spring 25 presses these nut segments toward the sleeve and a cam 26 is mounted on a screw stud 27 between the free ends of the nut segments. A lever arm 28 extending from the cam provides means for rotating the cam and retracting the nut segments to permit free movement of the cutter carrier body. A cup-like shield 29 is mounted on the flange 24 and encloses the split nut and cam and is held in place by the screws 23 and 27. A lug 30 projects from the outer face of this shield and serves as a stop to limit the outer throw of the lever 28 when retracting the nut segments.

When tightening the draw-in screw 15, it is necessary to hold the sleeve 14 stationary. For this purpose, we provide a locking plunger or pin 31 which is mounted to slide in a recess 17' in the body 17 and may be projected into an opening 14' in the sleeve 14 so as to prevent the sleeve from turning when the screw 15 is tightened or loosened. A spring 32 serves to retract the plunger pin when pressure is released. The plunger pin has a slot 33 into which the edge of the shield 29 projects so as to limit the movement of the plunger pin and hold it in place.

This locking arrangement permits the operator to hold the handle 19 and plunge the pin 31 with one hand, and by means of a tool inserted into an opening 15' in the end of the screw to turn said screw with the other hand, sufficient leverage being afforded therefor.

The cutter 18 is carried by a bar 40 which is slidable in a groove 41 in the carrier body 17. The cutter is reversible preferably so that one end may be used for truing the commutator and the other end for undercutting between the segments. A screw 42 serves to hold the cutter tight. Adjustment is effected by a screw 43 and spring 44 coacting with a cross-piece 45 which is clamped to the cutter by screw 46. The screw 43 rotates freely in the slotted end of the cross piece and has a graduated scale 47 around its flange which with the index mark or "0" on the cross-piece indicates the degree of rotation and hence may be used to keep the operator informed of the amount the cutter has been fed toward the work. The bar 40 may carry a pin 40' to limit its movement.

The undercutting operation is effected by the use of a lever and link (not shown) connecting the body of the carrier to a stud 50 on the slide bar 40.

The truing or trimming of the commutator segments is effected by rotating the carrier body and the cutter around the sleeve 14 which movement feeds the cutter from the outer end toward the inner end of the commutator.

In order to avoid overcutting, that is, running the cutter beyond the inner ends of the commutator segments, we provide a cam shoulder 54 on the sleeve 14. When the cutter is properly set or adjusted, this shoulder will serve as a stationary abutment for the inner edges 55 of the split nut parts 21, 22 so that as the carrier body is rotated, the split nut parts will ultimately engage this cam shoulder which will thus retract the split nut parts and stop the feeding action.

The body 17 is split on one side for adjustment by a screw 56 to a nice running fit on the sleeve 14.

In truing the commutator, the armature is gripped in the vise. A collet of the desired size is inserted into the sleeve, making sure that the pin 16 is properly positioned to prevent the collet from turning. The carrier body is slid over the sleeve and is held in one hand with a finger on the plunger. The split nut is released and the sleeve pulled back and revolved until the plunger drops into its hole. A tool is inserted in the hole in the screw 15 and the screw tightened to cause the collet to tightly embrace the armature shaft. The carrier body is then moved toward the commutator and the cutter bar is set and locked. The cutter is adjusted and the split nut moved to engaging position.

For undercutting the cutter is reversed and a tool is connected to the stud 50 on the cutter bar for moving it back and forth.

It will be understood of course that the tool will receive different sized collets so as to be able to engage the different sizes of armature shafts likely to be met in use.

We claim:

1. A commutator trimmer including a collet and a draw-in screw, a sleeve embracing said collet and screw and having a recess, a cutter carrier rotatable on said sleeve, an interlocking plunger pin mounted in the carrier and adapted to be inserted into said recess in said sleeve for interlocking the carrier to the sleeve, said pin having a notch in one side and a member carried by said cutter carrier and projecting into said notch to limit the movement of said pin.

2. A commutator trimmer including a collet and a draw-in screw, a sleeve embracing said collet and screw and having a recess, a cutter carrier rotatable on said sleeve, an interlocking spring retracted plunger pin mounted in the carrier and adapted to be inserted into said recess in said sleeve for interlocking the carrier to the sleeve, a split nut carried by said cutter carrier and coacting with said sleeve and a shield enclosing said nut and holding said pin in place.

3. A commutator trimmer including a collet for gripping a commutator shaft, a sleeve embracing said collet, a cutter carrier having a split nut mounted to rotate and move longitudinally on said sleeve, a shield surrounding said nut and secured to said carrier, a cam mounted within said shield for retracting said nut and a plunger pin for interlocking said sleeve and carrier when the nut is retracted, said shield limiting the movement of said pin.

JOHN SIMPSON, JR.
JAMES WILLIAMS.